Figure 1:

J. GREACEN, Jr.
WRINGER-ROLL.

No. 192,577.  Patented July 3, 1877.

UNITED STATES PATENT OFFICE

JOHN GREACEN, JR., OF NEW YORK, N. Y.

IMPROVEMENT IN WRINGER-ROLLS.

Specification forming part of Letters Patent No. 192,577, dated July 3, 1877; application filed March 26, 1877.

*To all whom it may concern:*

Be it known that I, JOHN GREACEN, Jr., of the city of New York and State of New York, have invented a new and useful Improvement in Rubber Rolls for Clothes-Wringing Machines, of which the following is a specification:

The object of the present invention is to produce a roll for clothes-wringing machines in which the rubber forming the body of the roll shall be held firmly upon the shaft or spindle that supports it, and with the least diminution of its elasticity.

It is well known that in clothes-wringing machines there is a great strain brought upon the periphery of the roll in a line tangential thereto, tending to loosen the rubber and turn it around on its shaft or spindle, and many methods have heretofore been adopted or suggested to prevent this very undesirable result—such, for instance, as forming the shaft with ridges, or incorporating into it strips of canvas or threads wound diagonally to the axis of the roll; but invariably these appliances have tended to impair the elasticity of the roll, and frequently, also, to diminish its durability.

The improvement now proposed produces a roll in which a spindle of perfect cylindrical form can be used, and in which the full elasticity of the rubber is preserved, and at the same time a firm adhesion of the rubber upon the spindle be secured.

In carrying out this invention, the first thing to be done is to take a wrought-iron shaft or spindle and free its surface from scale and all impurities and foreign matters, such as oil, dust, &c. This may be effected by any means adapted thereto, as by turning down the shaft so as to expose a perfectly fresh and clean surface of metal, by the use of strong alkalies, or by pickling the iron in a bath of dilute sulphuric or other acid. After the shaft has been so cleaned care should be taken not to handle it previous to the application of the rubber, as the rubber will not adhere firmly unless the metal is absolutely free from surface impurities.

The shaft, being now dry and clean, is preferably to be moderately heated, and then covered with vulcanizable-rubber compound, in the well-known way of building up rubber rolls, by winding it with sheet-rubber until brought to the required diameter. If preferred, the shaft, when cleaned, may be first coated with rubber cement; but this step is not absolutely necessary.

After the roll has been brought to the desired size, it is either wrapped or put into a mold, and properly cured or vulcanized.

If the work is carefully done this process will be found to produce a roll in which the rubber will preserve the greatest possible elasticity, and yet will adhere to the spindle with great tenacity. At the same time, by reason of the cylindrical form of the spindle, the roll will be far more durable than when the spindle is made polygonal or fluted, for when thus made the angles or ridges have a tendency to wear and break down the interior of the rubber, and thus, of course, deteriorate or destroy the roll.

In the accompanying drawing there is shown a wringer-roll made as above set forth, one-half of the spindle and the rubber being cut away for a portion of the length of the roll, in order to show the intimate contact of the iron and the rubber, and the homogeneous character of the latter from its inner to its outer circumference.

What is claimed is—

1. The process hereinbefore described of forming rolls for clothes-wringing machines, which consists in preparing a wrought-iron shaft or spindle by freeing it from scale and foreign matters, substantially as described, building up upon the shaft thus prepared a body of vulcanizable-rubber compound until the requisite form and thickness is attained, and then vulcanizing the same.

2. As a new article of manufacture, an improved clothes-wringer roll, in which the rubber of such roll is vulcanized directly onto the central iron shaft or spindle, substantially as described.

JOHN GREACEN, JR.

Witnesses:
SAML. A. DUNCAN,
BENJ. A. SMITH.